(12) United States Patent
Minamisawa et al.

(10) Patent No.: US 12,474,543 B2
(45) Date of Patent: Nov. 18, 2025

(54) OPTICAL UNIT WITH RUNOUT CORRECTION FUNCTION

(71) Applicant: NIDEC SANKYO CORPORATION, Nagano (JP)

(72) Inventors: Shinji Minamisawa, Nagano (JP); Takeshi Sue, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 810 days.

(21) Appl. No.: 17/680,169

(22) Filed: Feb. 24, 2022

(65) Prior Publication Data

US 2022/0283404 A1    Sep. 8, 2022

(30) Foreign Application Priority Data

Mar. 8, 2021   (JP) ................... 2021-036017

(51) Int. Cl.
*G02B 7/00*    (2021.01)
*G01D 5/14*    (2006.01)
*G02B 7/18*    (2021.01)
*G03B 30/00*   (2021.01)
*H01F 7/08*    (2006.01)

(52) U.S. Cl.
CPC .......... *G02B 7/1805* (2013.01); *G01D 5/145* (2013.01); *G03B 30/00* (2021.01); *H01F 7/081* (2013.01)

(58) Field of Classification Search
CPC ...... H04N 23/68; H04N 13/282; H04N 23/58; G02B 27/64; G02B 27/646; G03B 3/10; G03B 5/00; G03B 13/36; G03B 17/17; G03B 2205/0007; G03B 2205/0023; G03B 5/06; G03B 30/00; G06V 10/147; G06V 30/1429; G06V 30/1437; G08B 13/19626; G08B 13/19628
USPC ........................................... 348/335
See application file for complete search history.

(56) References Cited

U.S. PATENT DOCUMENTS

2018/0120674 A1* 5/2018 Avivi .................. G03B 3/10
2020/0400464 A1* 12/2020 Yedid ................. H04N 23/58

FOREIGN PATENT DOCUMENTS

JP    2013246313 A  * 12/2013
JP    2021027431     2/2021

* cited by examiner

*Primary Examiner* — Henry Duong
(74) *Attorney, Agent, or Firm* — JCIPRNET

(57) ABSTRACT

An optical unit with a runout correction function includes a reflection member, a camera module having a lens and an image pickup element, a holding member that rotatably holds the reflection member and also holds the camera module, and a fixing member that rotatably holds the holding member. A second rotation mechanism rotates the reflection member held in the holding member with an optical axis direction, which is a direction of an optical axis of the lens, as an axis direction of the rotation and is capable of runout correction in a yaw direction. In the optical unit with a runout correction function, when the runout correction in the yaw direction is performed, the image pickup element held in the holding member is rotated together with the reflection member with the optical axis direction as the axis direction of rotation.

7 Claims, 5 Drawing Sheets

OPTICAL UNIT WITH RUNOUT CORRECTION FUNCTION

CROSS REFERENCE TO RELATED APPLICATIONS

The present invention claims priority under 35 U.S.C. § 119 to Japanese Application No. 2021-036017 filed on Mar. 8, 2021, the entire content of which is incorporated herein by reference.

BACKGROUND

Field of the Invention

At least an embodiment of the present invention relates to an optical unit with a runout correction function having a runout correction function to correct runout of an optical image.

Description of the Related Documents

Conventionally, an optical unit with a runout correction function, which corrects the runout of an optical image by oscillating a reflection portion having a mirror, is known (see, for example, JP 2021-27431 Gazette 1). The optical unit described in JP 2021-27431 Gazette 1 includes a lens unit, an image pickup element mounted on a substrate, and a reflection-portion oscillating mechanism to oscillate the reflection portion with respect to the lens unit and the image pickup element. The reflection-portion oscillating mechanism rotates the reflection portion with respect to the lens unit and the image pickup element with a pitch direction (pitching direction) as an axis direction of rotation, and rotates the reflection portion with respect to the lens unit and the image pickup element with a yaw direction (yawing direction) as the axis direction of rotation.

In the case of the optical unit described in JP 2021-27431, if the reflection portion is rotated with respect to the image pickup element using the yaw direction as the axis direction of rotation, there is a concern that an image acquired by the image pickup element would be inclined. Even if the image acquired by the image pickup element is inclined, the inclination of the image can be corrected by performing electronic correction on the image acquired by the image pickup element. However, if electronic correction is performed on the image acquired by the image pickup element, the image after the correction may be deteriorated and the image quality may be degraded. In addition, when wide-angle correction is performed, the image after the correction is more likely to be degraded.

Therefore an object of at least an embodiment of the present invention is to provide an optical unit with a runout correction function which can prevent inclination of an image acquired by an image pickup element, even if runout correction is performed in the yaw direction, in an optical unit with a runout correction function, capable of correcting runout in the pitch direction and in the yaw direction.

SUMMARY

In order to solve the above problem, the optical unit with a runout correction function of at least an embodiment of the present invention includes a reflection member on which a reflection surface is formed to reflect light incident from an outside, a camera module having a lens through which the light reflected by the reflection surface passes and an image pickup element to which the light having passed through the lens enters, a holding member that rotatably holds the reflection member and also holds the camera module, a fixing member that rotatably holds the holding member, a first rotation mechanism that rotates the reflection member with respect to the holding member, and a second rotation mechanism that rotates the holding member with respect to the fixing member, in which an optical axis direction, which is a direction of an optical axis of the lens, and an incident direction of the light to the reflection surface are orthogonal to each other, the first rotation mechanism rotates the reflection member with respect to the holding member with a direction orthogonal to the optical axis direction and intersecting the incident direction as the axis direction of rotation, and the second rotation mechanism rotates the holding member with respect to the fixing member with the optical axis direction as the axis direction of rotation.

The optical unit with a runout correction function of at least an embodiment of the present invention has the reflection member, the camera module having the lens and the image pickup element, the holding member that rotatably holds the reflection member and also holds the camera module, and the fixing member that rotatably holds the holding member, and the second rotation mechanism rotates the holding member with the optical axis direction, which is a direction of an optical axis of the lens, as an axis direction of the rotation. In other words, in at least an embodiment of the present invention, the second rotation mechanism rotates the reflection member held in the holding member with the optical axis direction as the axis direction of rotation and thus, runout correction in the yaw direction is enabled. Moreover, in at least an embodiment of the present invention, when the holding member is rotated to correct the runout in the yaw direction, the image pickup element held in the holding member is rotated together with the reflection member with the optical axis direction as the axis direction of rotation. Therefore, in at least an embodiment of the present invention, inclination of the image acquired by the image pickup element can be prevented even when the runout correction in the yaw direction is performed.

In at least an embodiment of the present invention, an axis of rotation of the holding member with respect to the fixing member is preferably matched with an optical axis of the lens. With this configuration, more appropriate runout correction in the yaw direction can be performed by rotating the holding member with respect to the fixing member.

In at least an embodiment of the present invention, the axis of rotation of the holding member with respect to the fixing member preferably passes through the center of gravity of a movable body which includes the reflection member, the camera module, and the holding member and which is rotatable with respect to the fixing member with the optical axis direction as the axis direction of rotation. With this configuration, the movable body can be smoothly rotated with respect to the fixing member by the second rotation mechanism.

In at least an embodiment of the present invention, the first rotation mechanism includes a drive magnet and a drive coil opposed to each other in the optical axis direction, and the drive magnet and the drive coil are preferably disposed on the axis of rotation of the holding member with respect to the fixing member. With this configuration, even in a state where the holding member is rotated with respect to the fixing member (that is, even in a state where the runout correction in the yaw direction is being performed), misalignment between the drive magnet and the drive coil can be suppressed. Therefore, even in the state where the runout correction in the yaw direction is being performed, the runout correction in the pitch direction can be properly performed.

In at least an embodiment of the present invention, it is more preferable that the center of the drive magnet and the center of the drive coil are disposed on the axis of rotation of the holding member with respect to the fixing member when the reflection member is disposed at a predetermined reference position with respect to the holding member. With this configuration, even in the state where the holding member is rotated with respect to the fixing member, the misalignment between the drive magnet and the drive coil can be effectively suppressed. Therefore, even in the state where the runout correction in the yaw direction is being performed, the runout correction in the pitch direction can be performed more properly.

In at least an embodiment of the present invention, it is preferable that the optical unit with a runout correction function includes a magnetic sensor detecting a position of the reflection member with respect to the holding member, the magnetic sensor is opposed to the drive magnet in the optical axis direction, and the magnetic sensor is disposed on the axis of rotation of the holding member with respect to the fixed member. With this configuration, even in the state where the holding member is rotated with respect to the fixing member (that is, even in the state where the runout correction in the yaw direction is being performed), misalignment between the drive magnet and the magnetic sensor can be suppressed. Therefore, even in the state where the runout correction in the yaw direction is being performed, the position of the reflection member with respect to the holding member can be properly detected in the pitch direction.

In at least an embodiment of the present invention, it is more preferable that a center of the magnetic sensor is disposed on the axis of rotation of the holding member with respect to the fixing member when the reflection member is disposed at the reference position with respect to the holding member. With this configuration, even in the state where the holding member is rotated with respect to the fixing member, the misalignment between the drive magnet and the magnetic sensor can be effectively suppressed. Therefore, even in the state where the runout correction in the yaw direction is being performed, the position of the reflection member with respect to the holding member can be detected more properly in the pitch direction.

As described above, with at least an embodiment of the present invention, inclination of an image acquired by the image pickup element can be prevented even when the runout correction in the yaw direction is performed in the optical unit with a runout correction function, capable of the runout correction in the pitch direction and the yaw direction.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

Figure 1:
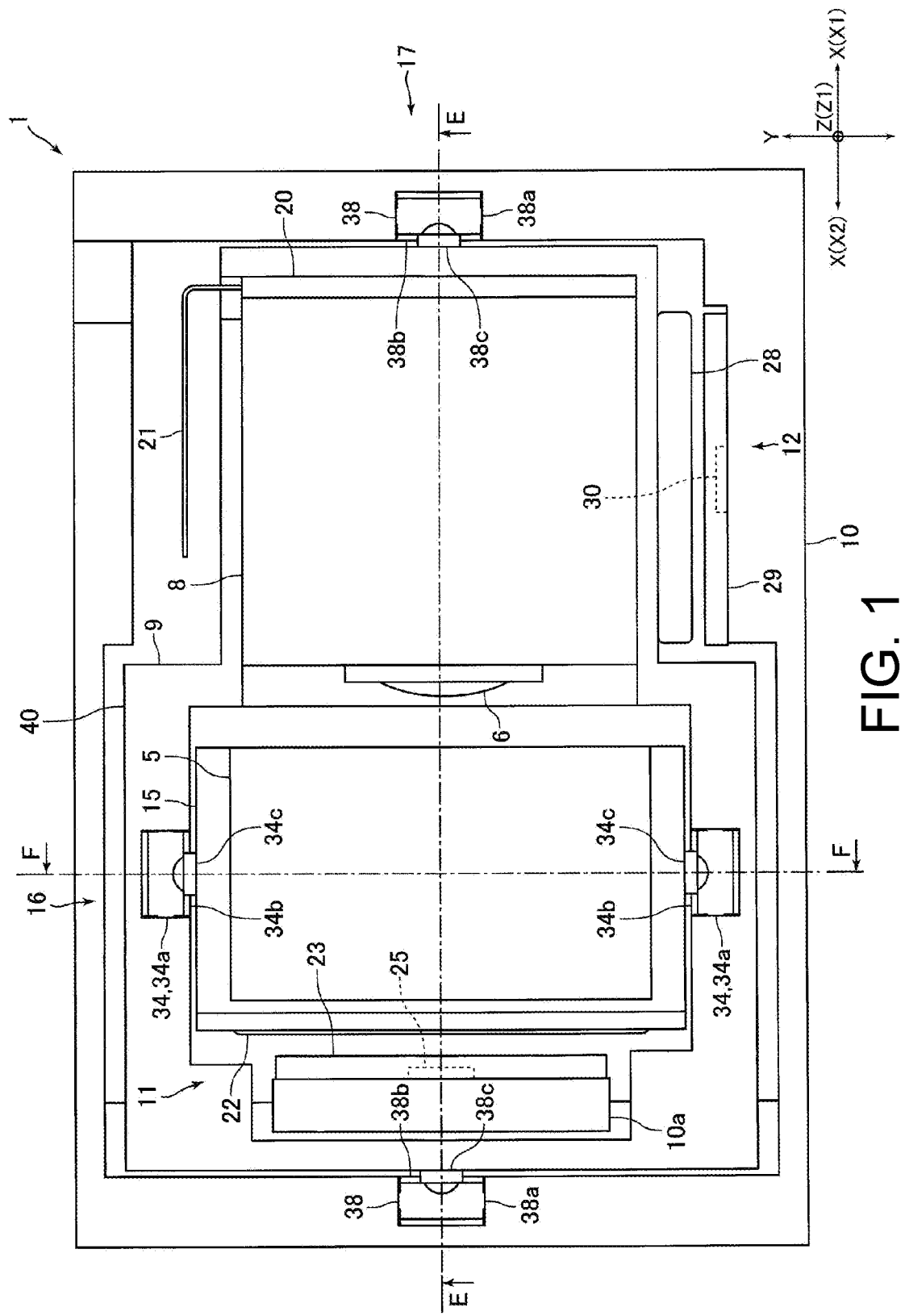
FIG. 1 is a plan view of an optical unit with a runout correction function according to an embodiment of the present invention.
Figure 2:
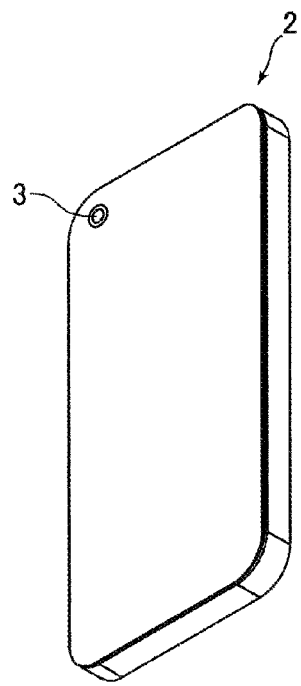
FIG. 2 is a perspective view of a smartphone in which the optical unit with a runout correction function shown in FIG. 1 is incorporated.
Figure 3:
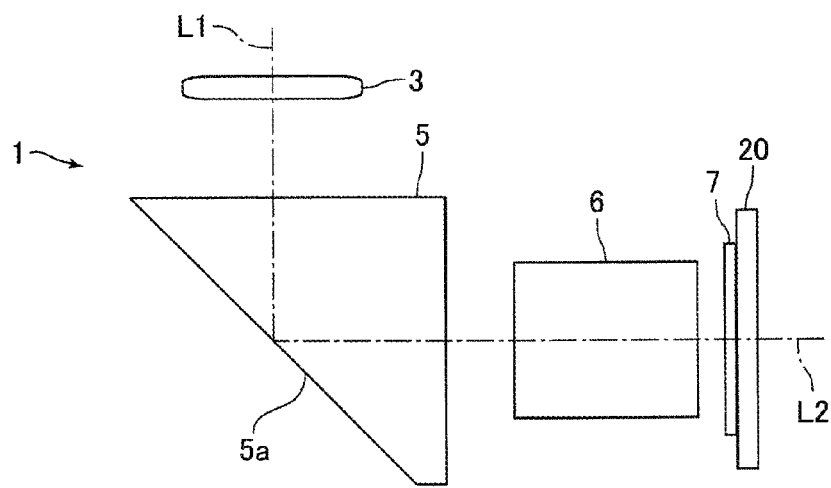
FIG. 3 is a schematic diagram for explaining a configuration of an optical system of the optical unit with a runout correction function shown in FIG. 1.
Figure 3:
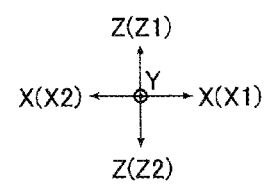
Figure 4:
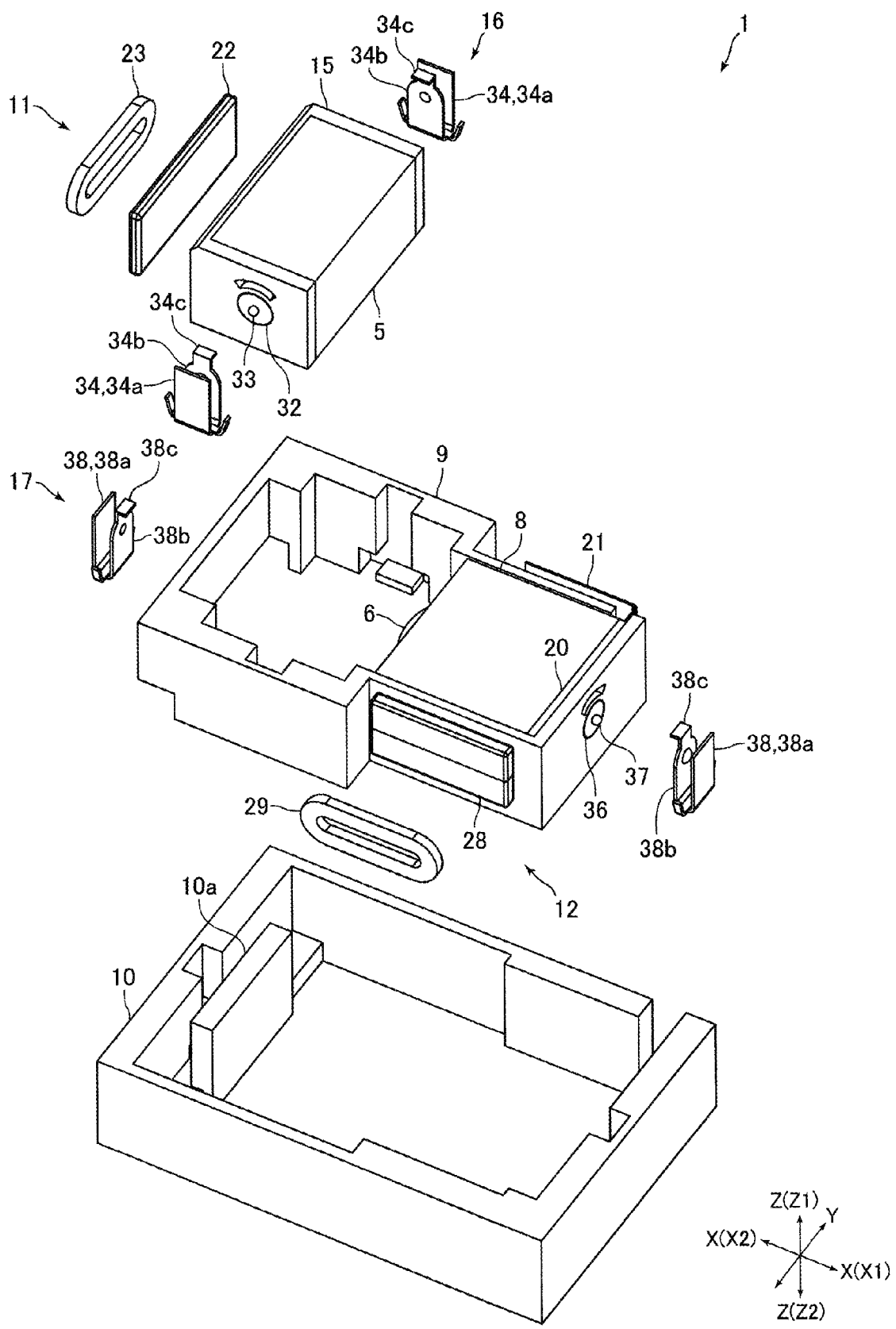
FIG. 4 is an exploded perspective view of the optical unit with a runout correction function shown in FIG. 1.
Figure 5:
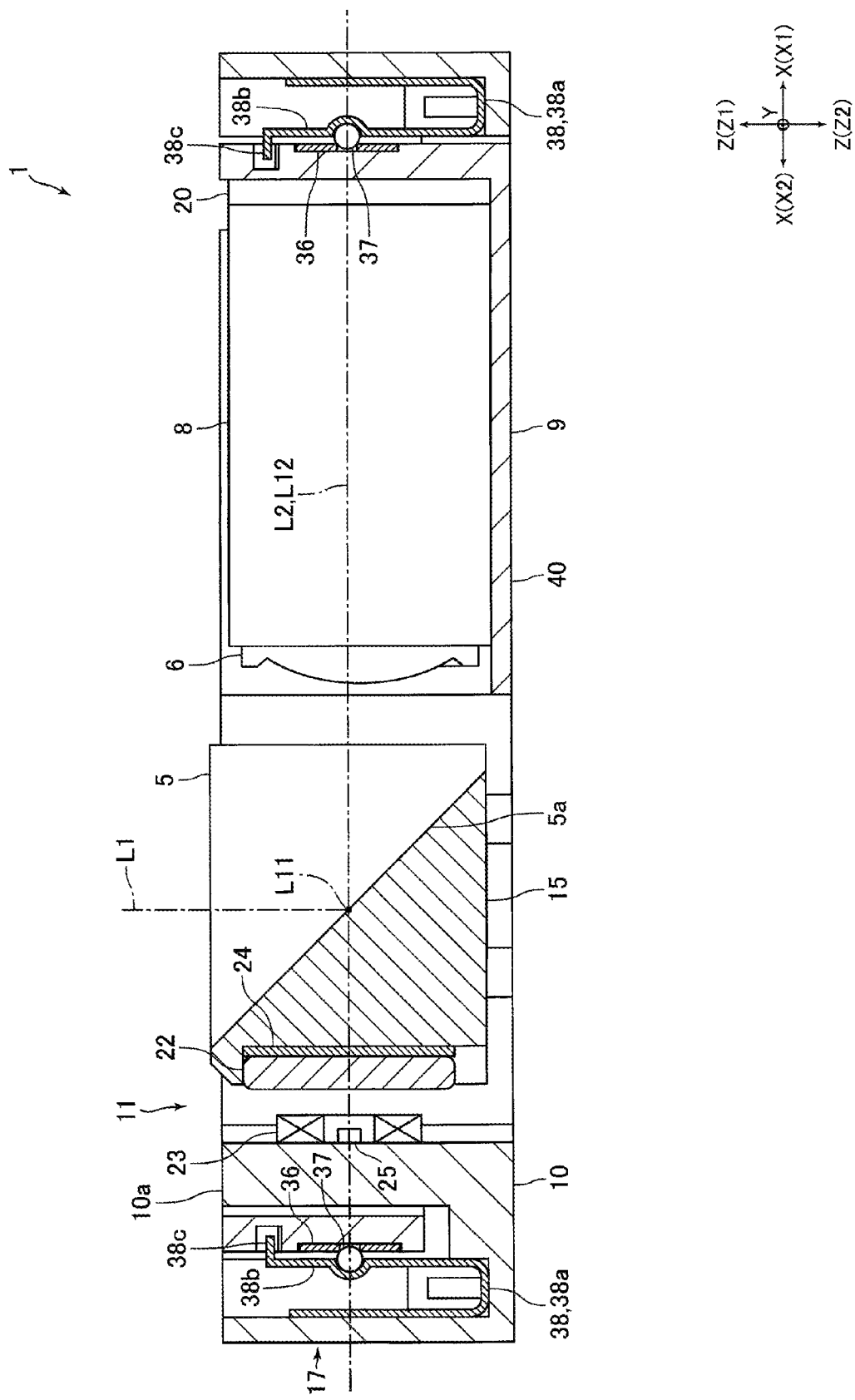
FIG. 5 is a cross-sectional view of an E-E section of FIG. 1.
Figure 6:
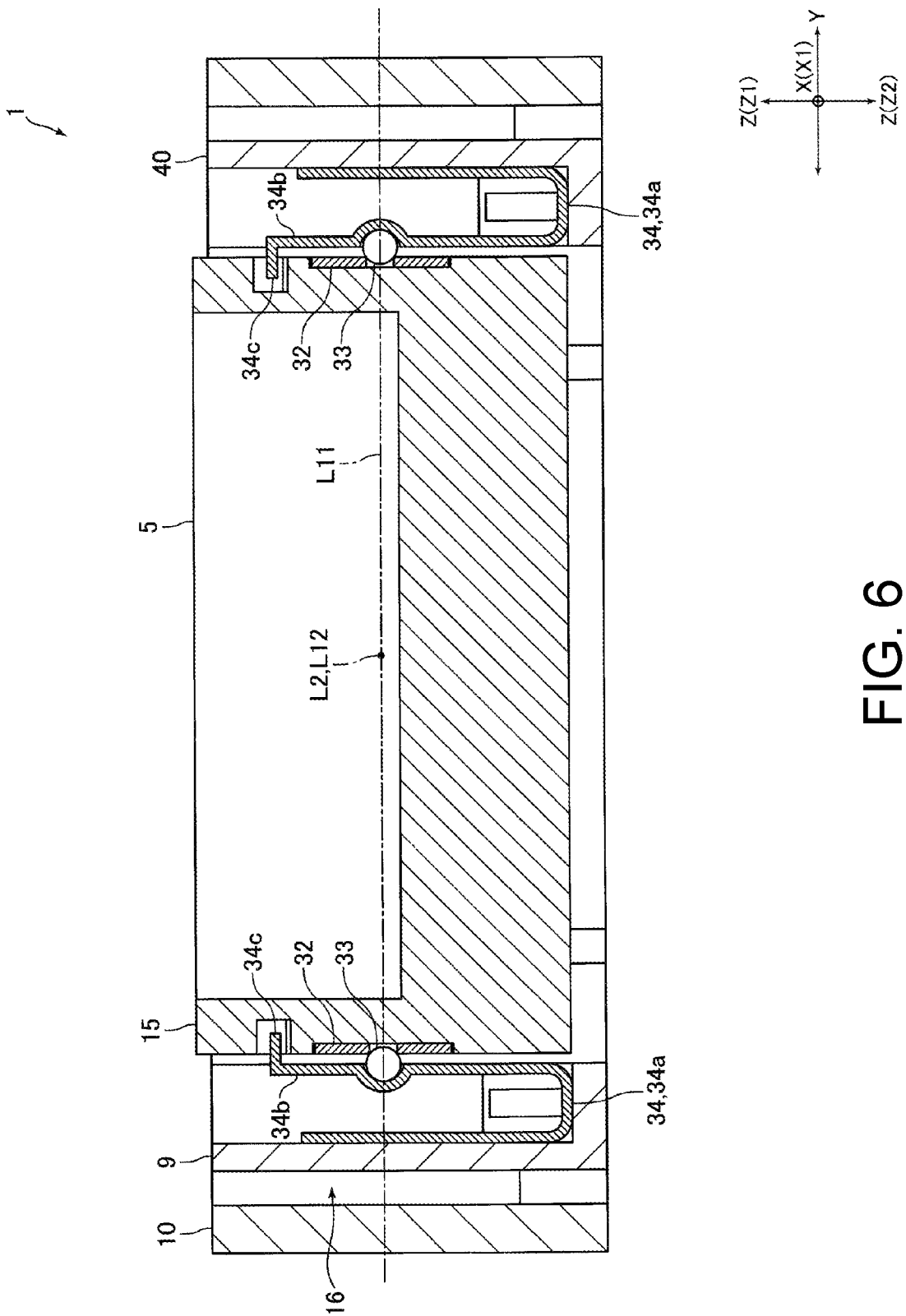
FIG. 6 is a cross-sectional view of an F-F section of FIG. 1.

In the following, embodiments of the present invention will be described with reference to the drawings.
Configuration of Optical Unit with Runout Correction Function FIG. 1 is a plan view of an optical unit 1 with a runout correction function according to an embodiment of the present invention. FIG. 2 is a perspective view of a smartphone 2 in which the optical unit 1 with a runout correction function shown in FIG. 1 is incorporated. FIG. 3 is a schematic diagram for explaining a configuration of an optical system of the optical unit 1 with a runout correction function shown in FIG. 1. FIG. 4 is an exploded perspective view of the optical unit 1 with a runout correction function shown in FIG. 1. FIG. 5 is a cross-sectional view of an E-E section of FIG. 1. FIG. 6 is a cross-sectional view of an F-F section of FIG. 1.

The optical unit 1 with a runout correction function (hereinafter referred to as "optical unit 1") in this embodiment is a camera with a runout correction function to correct the runout of an optical image. The optical unit 1 is, for example, incorporated in a smartphone 2. A lens 3 for photographing is attached to the smartphone 2. Light that has passed through the lens 3 enters the optical unit 1. Note that the optical unit 1 may be incorporated in a portable device or the like other than the smartphone 2.

The optical unit 1 has a prism 5 as a reflection member on which a reflection surface 5a that reflects light incident from the outside is formed, and a camera module 8 having a lens 6 and an image pickup element 7 (see FIG. 3). The image pickup element 7 is, for example, a CMOS image sensor. The term "lens 6" in this specification is supposed to include not only a single lens but also a lens group consisting of a plurality of lenses. The lens 6 in this embodiment is a lens group consisting of a plurality of lenses.

Moreover, the optical unit 1 has a holder 9 as a holding member to hold the prism 5 and the camera module 8, and a housing 10 as a fixing member to hold the holder 9. The prism 5 is rotatably held in the holder 9. The holder 9 is rotatably held in the housing 10. The optical unit 1 includes a first rotation mechanism 11 to rotate the prism 5 with respect to the holder 9 and a second rotation mechanism 12 to rotate the holder 9 with respect to the housing 10.

The prism 5 is fixed to a prism holder 15. In other words, the optical unit 1 includes the prism holder 15 to which the prism 5 is fixed. The prism holder 15 is formed of a resin material. The prism holder 15 is rotatably held in the holder 9, and the prism 5 is rotatably held in the holder 9 via the prism holder 15. Moreover, the optical unit 1 includes a rotating shaft portion 16 which constitutes rotation centers of the prism 5 and the prism holder 15 with respect to the holder 9, and a rotating shaft portion 17 which constitutes a rotation center of the holder 9 with respect to the housing 10.

The reflection surface 5a of the prism 5 receives the light that has passed through the lens 3. The reflection surface 5a reflects light incident to the reflection surface 5a through the lens 3 toward the image pickup element 7. The reflection surface 5a bends the optical axis of the light incident to the reflection surface 5a by approximately 90°. The light reflected by the reflection surface 5a passes through the lens 6, and the light having passed through the lens 6 enters the image pickup element 7. An optical axis L1 of the lens 3 is orthogonal to an optical axis L2 of the lens 6. That is, the optical axis direction, which is the direction of the optical axis L2 of the lens 6, is orthogonal to the incident direction of the light to the reflection surface 5a. The normal line passing through the center of the imaging surface of the image pickup element 7 is matched with the optical axis L2 of the lens 6.

In the following description, it is assumed that the incident direction of light to the reflection surface 5a (that is, the direction of the optical axis L1 of the lens 3, a Z direction in FIG. 1 and the like) is a vertical direction, the optical axis direction of the lens 6 (an X direction in FIG. 1 and the like) is a front-back direction, and a Y direction in FIG. 1 and the like, which is orthogonal to the vertical direction and the front-back direction, is the left-right direction. Moreover, it is assumed that a side in which the lens 3 is disposed with respect to the optical unit 1 in the vertical direction (a Z1 direction side in FIG. 3 and the like) is an "upper" side, and a side opposite thereto (a Z2 direction side in FIG. 3 and the like) is a "lower" side. Furthermore, it is assumed that a side on which the camera module 8 is disposed with respect to the prism 5 in the front-back direction (an X1 direction side in FIG. 3 and the like) is a "front" side, and a side opposite thereto (an X2 direction side in FIG. 3 and the like) is a "rear" side.

The holder 9 is rotatable with respect to the housing 10 with the front-back direction as the axis direction of rotation. The second rotation mechanism 12 rotates the holder 9 with respect to the housing 10 with the front-back direction as the axis direction of rotation. The prism 5 and the prism holder 15 are rotatable with respect to the holder 9 with a direction orthogonal to the front-back direction and intersecting the vertical direction as the axis direction of rotation. The first rotation mechanism 11 rotates the prism 5 and the prism holder 15 with respect to the holder 9 with the direction orthogonal to the front-back direction and intersecting the vertical direction as the axis direction of rotation.

The axis directions of rotation of the prism 5 and the prism holder 15 with respect to the holder 9 vary depending on a rotating position of the holder 9 with respect to the housing 10, but it is slightly inclined from the left-right direction or is matched with the left-right direction. In this embodiment, when the holder 9 is disposed at a predetermined reference position with respect to the housing 10, the axis directions of rotation of the prism 5 and the prism holder 15 with respect to the holder 9 are matched with the left-right direction. Moreover, in this embodiment, when the holder 9 is disposed at the reference position with respect to the housing 10, and the prism 5 is disposed at the predetermined reference position with respect to the holder 9, the reflection surface 5a is inclined by 45° to the vertical direction when viewed from the left-right direction.

The optical unit 1 corrects runout of an optical image by performing at least either one of the following operations, that is, a rotating operation of the holder 9 with respect to the housing 10, and a rotating operation of the prism 5 and the prism holder 15 with respect to the holder 9. In this embodiment, the runout of the optical image in the pitch direction is corrected by the rotating operation of the prism 5 with respect to the holder 9, and the runout of the optical image in the yaw direction is corrected by the rotating operation of the holder 9 with respect to the housing 10.

The camera module 8 includes a substrate 20 on which the image pickup element 7 is mounted. The image pickup element 7 is mounted on a rear surface of the substrate 20. The image pickup element 7 is disposed on a front side of the lens 6. A flexible printed circuit board 21 is withdrawn from the substrate 20. As described above, the lens 6 is a lens group consisting of a plurality of lenses. The lens 6 in this embodiment includes a focus lens and a zoom lens. The camera module 8 includes a focus-lens drive mechanism to drive the focus lens and a zoom-lens drive mechanism to drive the zoom lens. The camera module 8 does not have to include at least either one of the focus-lens drive mechanism and the zoom-lens drive mechanism.

The holder 9 is formed of a resin material. An outer shape of the holder 9 is substantially rectangular, and the holder 9 is disposed so that a long side direction of the holder 9 matches the front-back direction when viewed from the vertical direction. The camera module 8 is fixed to a front side part of the holder 9. The prism holder 15 is rotatably attached to a rear side part of the holder 9. A through hole penetrating in the vertical direction is formed on the rear side part of the holder 9 where the prism holder 15 is attached. The housing 10 is formed of a resin material. The housing 10 is formed having a rectangular frame shape, and the housing 10 is disposed so that the long side direction of the housing 10 matches the front-back direction when viewed from the vertical direction. The holder 9 is disposed on an inner peripheral side of the housing 10.

The first rotation mechanism 11 includes a drive magnet 22 and a drive coil 23 opposed to each other in the front-back direction. The drive magnet 22 is formed having a rectangular flat-plate shape. The drive magnet 22 is fixed to a rear surface of the prism holder 15 and is fixed to the prism 5 through the prism holder 15. The drive magnet 22 is magnetized so that a magnetic pole of an upper half of an opposing surface to the drive coil 23 of the drive magnet 22 and a magnetic pole of a lower half of the opposing surface to the drive coil 23 of the drive magnet 22 are different from each other. A magnetic plate 24 formed of a magnetic material is disposed between the drive magnet 22 and the prism holder 15 (see FIG. 5).

The drive coil 23 is an air-core coil wound in an air-core configuration. The drive coil 23 is disposed on a rear side of the drive magnet 22. The drive coil 23 is fixed to a rear end portion of the housing 10. A coil fixing portion 10a where the drive coil 23 is fixed is formed on the rear end portion of the housing 10. The coil fixing portion 10a is disposed closer to a front side than the rear end portion of the holder 9. On an inner peripheral side of the drive coil 23, a magnetic sensor 25 to detect the position of the prism 5 with respect to the holder 9 (specifically, a rotating position of the prism 5 with respect to the holder 9) is disposed. The magnetic sensor 25 is, for example, a Hall element. The magnetic sensor 25 is fixed to the coil fixing portion 10a. The magnetic sensor 25 is opposed to the drive magnet 22 in the front-back direction.

The second rotation mechanism 12 includes a drive magnet 28 and a drive coil 29 opposed to each other in the left-right direction. The drive magnet 28 is formed having a rectangular flat-plate shape. The drive magnet 28 is fixed to one of side surfaces of the holder 9 in the left-right direction. Moreover, the drive magnet 28 is fixed to the front side part of the holder 9. The drive magnet 28 is magnetized so that the magnetic pole of the upper half of the opposing surface to the drive coil 29 of the drive magnet 28 and the magnetic pole of the lower half of the opposing surface to the drive coil 29 of the drive magnet 28 are different from each other. A magnetic plate (not shown) formed of a magnetic material is disposed between the drive magnet 28 and the holder 9.

The drive coil 29 is an air-core coil wound in the air-core configuration. The drive coil 29 is disposed outside the drive magnet 28 in the left-right direction. The drive coil 29 is fixed to the front side part of the housing 10. Moreover, the drive coil 29 is fixed to the inner side of one of the side surface portions in the left-right direction of the housing 10. On the inner peripheral side of the drive coil 29, a magnetic sensor 30 to detect the position of the holder 9 with respect to the housing 10 (specifically, the rotating position of the holder 9 with respect to the housing 10) is disposed (see FIG. 1). The magnetic sensor 30 is configured in the same way as the magnetic sensor 25. The magnetic sensor 30 is fixed to the housing 10. The magnetic sensor 30 is opposed to the drive magnet 28 in the left-right direction.

The rotating shaft portion 16 has a ball fixing plate 32 made of metal and fixed to the prism holder 15, a ball 33 made of metal and fixed to the ball fixing plate 32, and a plate spring 34 made of metal and biasing the ball 33. As shown in FIG. 6, the ball fixing plates 32 are fixed to both side surfaces in the left-right direction of the prism holder 15, and the balls 33 are disposed on both sides in the left-right direction of the prism holder 15. The ball 33 is fixed to the ball fixing plate 32 by welding. The plate springs 34 are disposed on both sides of the ball 33 in the left-right direction and bias the ball 33 inwardly in the left-right direction.

The plate spring 34 includes a held portion 34a held in the holder 9 and a spring portion 34b that is elastically deformable in the left-right direction with respect to the held portion 34a. The spring portion 34b biases the ball 33 from outside in the left-right direction. The spring portion 34b has a concave-curved receiving surface with which the ball 33 is brought into contact formed. At an upper end of the spring portion 34b, a retaining portion 34c is formed to prevent the ball 33 from being removed out to the upper side. The retaining portion 34c protrudes inwardly in the left-right direction.

The prism 5 and the prism holder 15 are rotated with respect to the holder 9 with a line passing through centers of two balls 33 disposed on the both sides of the prism holder 15 in the left-right direction (a line connecting the centers of the two balls 33) as the rotation center. That is, the line passing through the centers of the two balls 33 is an axis (rotation center line) L11 of rotation of the prism 5 with respect to the holder 9. The axis L11 passes near the center of the reflection surface 5a when viewed from an axis direction of the axis L11.

The rotating shaft portion 17 has a ball fixing plate 36 made of metal and fixed to the holder 9, a ball 37 made of metal and fixed to the ball fixing plate 36, and a plate spring 38 made of metal and biasing the ball 37. As shown in FIG. 5, the ball fixing plates 36 are fixed to both side surfaces in the front-back direction of the holder 9, and the balls 37 are disposed on both sides in the front-back direction of the holder 9. The ball 37 is fixed to the ball fixing plate 36 by welding. The plate springs 38 are disposed on both sides of the ball 37 in the front-back direction and bias the ball 37 inwardly in the front-back direction. The ball fixing plate 36, the ball 37, and the plate spring 38 disposed on the rear side of the holder 9 are disposed on the rear side of the coil fixing part 10a.

The plate spring 38 includes a held portion 38a held in the housing 10 and a spring portion 38b that is elastically deformable in the front-back direction with respect to the held portion 38a. The spring portion 38b biases the ball 37 from outside in the front-back direction. The spring portion 38b has a concave-curved receiving surface with which the ball 37 is brought into contact formed. At an upper end of the spring portion 38b, a retaining portion 38c is formed to prevent the ball 37 from being removed out to the upper side. The retaining portion 38c protrudes inwardly in the front-back direction.

The holder 9 rotates with respect to the housing 10 with a line passing through the centers of two balls 37 disposed on the both sides in the front-back direction of the holder 9 (a line connecting the centers of the two balls 37) as the center of rotation. That is, the line passing through the centers of the two balls 37 is an axis (rotation center line) L12 of rotation of the holder 9 with respect to the housing 10. The axis L12 of this embodiment is matched with the optical axis L2 of the lens 6. The axis L11 and the axis L12 intersect at an intersection of the optical axis L1 and the optical axis L2. In other words, the optical axis L1, the axis L11, and the axis L12 intersect at a single point.

In addition, the axis L12 passes through the center of gravity of a movable body 40 which can be rotated with respect to the housing 10 with the front-back direction as the axis direction. The movable body 40 is constituted by all members that are rotatable with respect to the housing 10. The movable body 40 in this embodiment is constituted by the prism 5, the camera module 8, the holder 9, the first rotation mechanism 11, the prism holder 15, the rotating shaft portion 16, the drive magnet 28, the ball fixing plate 36, and the ball 37.

In addition, the drive magnet 22, the drive coil 23, and the magnetic sensor 25 are disposed on the axis L12. Specifically, the center of the drive coil 23 and the center of the magnetic sensor 25 are disposed on the axis L12. Moreover, when the prism 5 is disposed at the reference position with respect to the holder 9, the center of the drive magnet 22 is disposed on the axis L12. That is, when the prism 5 is disposed at the reference position with respect to the holder 9, the center of the drive magnet 22, the center of the drive coil 23, and the center of the magnetic sensor 25 are disposed on the axis L12.

Main Effect of this Embodiment

As described above, in this embodiment, the holder 9 holds the camera module 8 having the image pickup element 7 and also rotatably holds the prism 5. Moreover, in this embodiment, the second rotation mechanism 12 rotates the holder 9 with respect to the housing 10 with the optical axis direction (front-back direction) of the lens 6 as the axis direction of rotation and performs runout correction in the yaw direction by rotating the prism 5 held in the holder 9 with the optical axis direction of the lens 6 as the axis direction of rotation. Furthermore, in this embodiment, when the holder 9 is rotated to perform the runout correction in the yaw direction, the image pickup element 7 held in the holder 9 rotates together with the prism 5 with the optical axis direction of the lens 6 as the axis direction of rotation, and the optical system of the optical unit 1 does not collapse. Therefore, in this embodiment, inclination of the image acquired by the image pickup element 7 can be prevented even when the runout correction in the yaw direction is performed.

In this embodiment, the axis L12 of rotation of the holder 9 with respect to the housing 10 matches with the optical axis L2 of the lens 6. Thus, in this embodiment, more appropriate runout correction in the yaw direction can be performed by rotating the holder 9 with respect to the housing 10. Moreover, in this embodiment, since the axis L12 passes through the center of gravity of the movable body 40 which is rotatable with respect to the housing 10 with the front-back direction as the axis direction, the second rotation mechanism 12 enables smooth rotation of the movable body 40 with respect to the housing 10.

In this embodiment, the drive magnet 22 and the drive coil 23 are disposed on the axis L12. Therefore, in this embodiment, even in a state where the holder 9 is rotated with respect to the housing 10 (that is, even when the runout correction in the yaw direction is being performed), the misalignment between the drive magnet 22 fixed to the prism holder 15 and the drive coil 23 fixed to the housing 10 can be suppressed. Therefore, in this embodiment, even in a state where the runout correction in the yaw direction is being performed, the runout correction in the pitch direction can be properly performed.

Particularly in this embodiment, the center of the drive magnet 22 and the center of the drive coil 23 are disposed on the axis L12 when the prism 5 is disposed at the reference position with respect to the holder 9 and thus, even in a state where the holder 9 is rotated with respect to the housing 10, misalignment between the drive magnet 22 and the drive coil 23 can be effectively suppressed. Therefore, in this embodiment, even in a state where the runout correction in the yaw direction is being performed, the runout correction in the pitch direction can be performed more properly.

In this embodiment, the magnetic sensor 25 is disposed on the axis L12. Therefore, in this embodiment, even in a state where the holder 9 is rotated with respect to the housing 10 (that is, even when the runout correction in the yaw direction is being performed), the misalignment between the drive magnet 22 fixed to the prism holder 15 and the magnetic sensor 25 fixed to the housing 10 can be suppressed. Therefore, in this embodiment, even in the state where the runout correction in the yaw direction is being performed, the position of the prism 5 with respect to the holder 9 in the pitch direction can be properly detected.

Particularly in this embodiment, since the center of the magnetic sensor 25 is disposed on the axis L12, even in a state where the holder 9 is rotated with respect to the housing 10, misalignment between the drive magnet 22 and the magnetic sensor 25 can be effectively suppressed. Therefore, in this embodiment, in the state where the runout correction in the yaw direction is being performed, the position of the prism 5 with respect to the holder 9 in the pitch direction can be properly detected.

Other Embodiments

The embodiment described above is an example of a preferred embodiment of the present invention but it is not limiting, and various modifications can be implemented within a range not changing the gist of at least an embodiment of the present invention.

In the above-described embodiment, the axis L12 does not have to pass through the center of gravity of the movable body 40. Moreover, in the above-described embodiment, the axis L12 and the optical axis L2 do not have to match each other. Furthermore, in the above-described embodiment, the center of the drive coil 23 may be displaced from the axis L12, and the center of the magnetic sensor 25 may be displaced from the axis L12. Furthermore, when the prism 5 is disposed at the reference position with respect to the holder 9, the center of the drive magnet 22 may be displaced from the axis L12.

In the above-described embodiment, the drive coil 23 may be fixed to the rear end portion of the holder 9. Moreover, in the above-described embodiment, the drive magnet 22 may be fixed to the housing 10 or the holder 9, and the drive coil 23 and the magnetic sensor 25 may be fixed to the prism holder 15. In this case, for example, the center of the drive magnet 22 is disposed on the axis L12, and the center of the drive coil 23 and the center of the magnetic sensor 25 are disposed on the axis L12 when the prism 5 is disposed at the reference position with respect to the holder 9. Moreover, in the above-described embodiment, the drive magnet 28 may be fixed to the housing 10, and the drive coil 23 and the magnetic sensor 25 may be fixed to the holder 9.

In the above-described embodiment, the drive magnet 28 and the drive coil 29 may be opposed to each other in the front-back direction. In this case, for example, the drive magnet 28 is fixed to both end sides in the left-right direction of the rear end portion of the holder 9, and the drive coil 29 is fixed to both end sides in the left-right direction of the rear end portion of the housing 10. Moreover, in this case, for example, the drive magnet 28 is fixed to both end sides in the left-right direction of a front end portion of the holder 9, and the drive coil 29 is fixed to both end sides in the left-right direction of a front end portion of the housing 10.

In the above-described embodiment, the first rotation mechanism 11 may include a shape-memory alloy instead of the drive magnet 22 and the drive coil 23. The first rotation mechanism 11 may include a motor and a power transmission mechanism that transmits power of the motor to the prism holder 15 instead of the drive magnet 22 and the drive coil 23. Similarly, in the above-described embodiment, the second rotation mechanism 12 may include a shape-memory alloy or may include a motor and a power transmission mechanism that transmits the power of the motor to the holder 9 instead of the drive magnet 28 and the drive coil 29.

In the above-described embodiment, the rotating shaft portion 16 may be constituted by, for example, a fixed shaft formed or fixed on the prism holder 15 and a bearing that holds the fixed shaft rotatably. Similarly, in the above-described embodiment, the rotating shaft portion 17 may be constituted by, for example, a fixed shaft formed or fixed in the holder 9 and a bearing that holds the fixed shaft rotatably.

In the above-described embodiment, the holder 9 is constituted by a single member, but the holder 9 may be constituted by two or more members. Similarly, in the above-described embodiment, the housing 10 is constituted by a single member, but the housing 10 may be constituted by two or more members. Moreover, in the above-described embodiment, the optical unit 1 may include a reflective mirror in which a reflection surface to reflect light incident from the outside is formed instead of the prism 5.

What is claimed is:

1. An optical unit with a runout correction function, comprising:
a reflection member on which a reflection surface is formed to reflect light incident from an outside; a camera module having a lens through which the light reflected by the reflection surface passes and an image pickup element to which the light having passed through the lens enters; a holding member to rotatably hold the reflection member and also to hold the camera module, wherein the holding member comprises a holder that holds the reflection member and the camera module, and an outer shape of the holder is substantially rectangular; a fixing member to rotatably hold the holding member; a first rotation mechanism to rotate the reflection member with respect to the holding member; and a second rotation mechanism to rotate the holding member with respect to the fixing member, wherein an optical axis direction, which is a direction of an optical axis of the lens, and an incident direction of the light to the reflection surface are orthogonal to each other;

the first rotation mechanism rotates the reflection member with respect to the holding member with a direction orthogonal to the optical axis direction and intersecting the incident direction as an axis direction of rotation; and the second rotation mechanism rotates the holding member with respect to the fixing member with the optical axis direction as the axis direction of rotation, wherein the axis of rotation of the holding member with respect to the fixing member passes through the center of gravity of a movable body which comprises the reflection member, the camera module, and the holding member and which is rotatable with respect to the fixing member with the optical axis direction as the axis direction of rotation.

2. The optical unit with a runout correction function according to claim 1, wherein an axis of rotation of the holding member with respect to the fixing member is matched with the optical axis of the lens.

3. The optical unit with a runout correction function according to claim 2, wherein the first rotation mechanism comprises a drive magnet and a drive coil opposed to each other in the optical axis direction; and the drive magnet and the drive coil are disposed on the axis of rotation of the holding member with respect to the fixing member.

4. The optical unit with a runout correction function according to claim 3, wherein a center of the drive magnet and a center of the drive coil are disposed on the axis of rotation of the holding member with respect to the fixing member when the reflection member is disposed at a predetermined reference position with respect to the holding member.

5. The optical unit with a runout correction function according to claim 4, further comprising:

a magnetic sensor detecting a position of the reflection member with respect to the holding member, wherein the magnetic sensor is opposed to the drive magnet in the optical axis direction; and the magnetic sensor is disposed on the axis of rotation of the holding member with respect to the fixing member.

6. The optical unit with a runout correction function according to claim 5, wherein a center of the magnetic sensor is disposed on the axis of rotation of the holding member with respect to the fixing member when the reflection member is disposed at the reference position with respect to the holding member.

7. The optical unit with a runout correction function according to claim 1, wherein the first rotation mechanism comprises a drive magnet and a drive coil opposed to each other in the optical axis direction; and the drive magnet and the drive coil are disposed on an axis of rotation of the holding member with respect to the fixing member.

* * * * *